United States Patent
Dietenhauser et al.

(10) Patent No.: US 8,029,670 B2
(45) Date of Patent: Oct. 4, 2011

(54) DEVICE FOR TREATING COOLING LUBRICANTS

(75) Inventors: Wolfgang Dietenhauser, Waltenhofen (DE); Robert Schielke, Pfronten (DE)

(73) Assignee: Deckel Maho Pfronten GmbH, Pfrontan (DE)

( * ) Notice: Subject to any disclaimer, the term of this patent is extended or adjusted under 35 U.S.C. 154(b) by 0 days.

(21) Appl. No.: 12/835,558

(22) Filed: Jul. 13, 2010

(65) Prior Publication Data

US 2011/0005985 A1    Jan. 13, 2011

(30) Foreign Application Priority Data

Jul. 13, 2009   (DE) .................... 20 2009 009 535 U

(51) Int. Cl.
    *B01D 33/04*      (2006.01)
    *B01D 39/10*      (2006.01)

(52) U.S. Cl. ........ 210/236; 210/232; 210/237; 210/238; 210/400; 210/401; 210/783; 210/406

(58) Field of Classification Search .................. None
See application file for complete search history.

(56) References Cited

U.S. PATENT DOCUMENTS

| | | | | |
|---|---|---|---|---|
| 3,768,657 A * | 10/1973 | Hoag | ............................ | 210/298 |
| 3,795,316 A * | 3/1974 | Wood | ............................ | 210/298 |
| 3,834,542 A * | 9/1974 | Linstruth | ...................... | 210/222 |
| 4,110,218 A * | 8/1978 | Marriott et al. | ................ | 210/223 |
| 4,137,169 A * | 1/1979 | El-Hindi | ......................... | 210/97 |
| 4,201,675 A * | 5/1980 | Damerau | ....................... | 210/387 |
| 4,390,428 A * | 6/1983 | Bratten | ......................... | 210/400 |
| 4,421,647 A * | 12/1983 | Estabrook et al. | ............. | 210/387 |
| 4,514,301 A * | 4/1985 | Parshall | ........................ | 210/400 |
| 4,518,496 A * | 5/1985 | Kanekubo | ..................... | 210/222 |
| 4,544,060 A * | 10/1985 | Enomoto | ...................... | 198/495 |
| 4,685,361 A * | 8/1987 | Myers | .............................. | 82/117 |
| 5,098,564 A * | 3/1992 | Miller et al. | ................... | 210/236 |
| 5,167,839 A * | 12/1992 | Widmer et al. | ................ | 210/784 |
| 5,221,469 A * | 6/1993 | Nehls | ............................. | 210/232 |
| 5,565,112 A * | 10/1996 | Bratten | ......................... | 210/780 |
| 5,601,729 A * | 2/1997 | Bratten | ......................... | 210/783 |
| 5,603,846 A * | 2/1997 | Uchiyama et al. | ............. | 210/784 |
| 5,624,579 A * | 4/1997 | Bratten | ......................... | 210/783 |
| 5,858,218 A * | 1/1999 | Setlock et al. | ........... | 210/167.01 |
| 5,919,358 A * | 7/1999 | Williams | ....................... | 210/160 |
| 5,961,828 A * | 10/1999 | McEwen | ....................... | 210/526 |
| 5,961,847 A * | 10/1999 | Creps et al. | ................... | 210/783 |
| 5,992,642 A * | 11/1999 | Ota | .................................. | 210/396 |
| 6,042,726 A * | 3/2000 | Anderson | ..................... | 210/297 |
| 6,066,255 A * | 5/2000 | Anderson | ..................... | 210/297 |
| 6,093,315 A * | 7/2000 | Croket | ...................... | 210/167.02 |
| 6,260,716 B1 * | 7/2001 | Fontaine et al. | .............. | 210/525 |
| 6,332,983 B1 * | 12/2001 | Tashiro et al. | ................ | 210/297 |
| 6,357,576 B1 * | 3/2002 | Enomoto | ...................... | 198/495 |
| 6,475,377 B1 * | 11/2002 | Fox et al. | ........................ | 210/90 |
| 6,500,339 B2 * | 12/2002 | Ogasawara | ................... | 210/295 |
| 6,511,597 B2 * | 1/2003 | Hori et al. | ..................... | 210/298 |

(Continued)

*Primary Examiner* — Robert James Popovics

(74) *Attorney, Agent, or Firm* — The Maxham Firm

(57) ABSTRACT

A device for treating cooling lubricants and chips of machine tools. The device includes a container for receiving the untreated mixture of cooling lubricant liquid and solids, an endless conveyor installed in the container for carrying off the collected solids from the container, at least one filtration unit disposed in the container for separating the cooling lubricant liquid from the solids, whereby the filtration unit is formed so as to be mobile and can be positioned as an insertion in the container over the lower run of the endless conveyor.

23 Claims, 3 Drawing Sheets

U.S. PATENT DOCUMENTS

| | | | | |
|---|---|---|---|---|
| 6,571,959 B1* | 6/2003 | Moore et al. | | 210/394 |
| 6,612,445 B2* | 9/2003 | Bratten | | 209/272 |
| 6,695,122 B2* | 2/2004 | Enomoto | | 198/495 |
| 6,835,315 B2* | 12/2004 | Fox et al. | | 210/739 |
| 7,014,760 B2* | 3/2006 | Ackermanns et al. | | 210/248 |
| 7,014,764 B2* | 3/2006 | Ackermanns et al. | | 210/297 |
| 7,115,200 B2* | 10/2006 | Ackermanns et al. | | 210/297 |
| 7,364,032 B2* | 4/2008 | Nisiguchi | | 198/495 |
| 7,364,652 B2* | 4/2008 | Middleton | | 210/158 |
| 7,410,569 B1* | 8/2008 | Tilev et al. | | 210/167.02 |
| 7,485,226 B2* | 2/2009 | Ackermanns et al. | | 210/297 |
| 7,638,061 B2* | 12/2009 | Moore | | 210/695 |
| 7,648,632 B2* | 1/2010 | Ackermanns et al. | | 210/248 |
| 7,681,710 B2* | 3/2010 | Kuhn et al. | | 198/370.06 |
| 7,806,254 B2* | 10/2010 | Brayman et al. | | 198/832 |
| 7,824,547 B2* | 11/2010 | Reynders et al. | | 210/171 |
| 7,882,960 B2* | 2/2011 | Hansen et al. | | 210/386 |
| 7,913,854 B2* | 3/2011 | Bratten et al. | | 210/400 |
| 2001/0006157 A1* | 7/2001 | Ogasawara | | 210/107 |
| 2002/0139722 A1* | 10/2002 | Bratten | | 209/272 |
| 2002/0166808 A1* | 11/2002 | Hori et al. | | 210/298 |
| 2003/0010723 A1* | 1/2003 | Fox et al. | | 210/739 |
| 2004/0262242 A1* | 12/2004 | Middleton | | 210/783 |
| 2005/0000880 A1* | 1/2005 | Ackermanns et al. | | 210/297 |
| 2005/0061727 A1* | 3/2005 | Ackermanns et al. | | 210/238 |
| 2006/0049112 A1* | 3/2006 | C. Moore | | 210/695 |
| 2006/0113238 A1* | 6/2006 | Ackermanns et al. | | 210/248 |
| 2006/0124523 A1* | 6/2006 | Ackermanns et al. | | 210/171 |
| 2006/0131227 A1* | 6/2006 | Pahl et al. | | 210/400 |
| 2007/0051672 A1* | 3/2007 | Reynders et al. | | 210/167.09 |
| 2007/0181492 A1* | 8/2007 | Uchiyama et al. | | 210/523 |
| 2007/0187211 A1* | 8/2007 | Vertogen et al. | | 198/461.1 |
| 2007/0210013 A1* | 9/2007 | Bratten et al. | | 210/783 |
| 2008/0073185 A1* | 3/2008 | Brayman et al. | | 198/860.2 |
| 2009/0152186 A1* | 6/2009 | Corsaro | | 210/231 |
| 2009/0255784 A1* | 10/2009 | Kuhn et al. | | 198/598 |
| 2010/0089816 A1* | 4/2010 | Pahl et al. | | 210/386 |
| 2010/0243412 A1* | 9/2010 | Brayman et al. | | 198/860.2 |
| 2011/0005985 A1* | 1/2011 | Dietenhauser et al. | | 210/171 |

* cited by examiner

DEVICE FOR TREATING COOLING LUBRICANTS

FIELD OF THE INVENTION

The invention relates generally to a device for treating cooling lubricants and chips or shavings of machine tools, and more particularly comprising a container for receiving the untreated mixture of cooling lubricant liquid and solids (chips), an endless conveyor installed in the container for removing the separated and collected solids (chips) from the container, and comprising at least one filtration unit disposed in the container for separating the solids from the cooling lubricant liquid.

BACKGROUND

The cooling lubricants used during the material-removing machining of workpieces represent a considerable financial factor of the entire operating costs of such machines. The cooling and lubricating liquids used for grinding, milling, turning, boring, for example, are contaminated by the chips and other particles produced during machining. The mixture of cooling lubricant liquid and solids, in particular, chips, produced in the machine tool has to be treated in separate processes outside the machine tool so that the cooling lubricant liquid may be reused and the separated chips utilized. In addition to the separation of relatively coarse and voluminous chips from the liquid medium, the finer-grained particles and dusts, which usually are particularly abrasive, must also be separated from the liquid so that the liquid thus purified may be reused as a cooling lubricant in the respective machine tool. Several prior art devices are presented below as examples of efforts along these lines.

German patent publication, DE-A-199 47 724, discloses a device for purifying liquids such as, for example, cooling lubricants (KSS) of material-removing machine tools wherein the contaminated liquid is subjected to filtration. In a container for receiving the untreated liquid/chips mixture, a scraper conveyor is installed near the bottom thereof, the lower run of which transports the chips deposited in the lower container part in a slantingly upward manner to an ejection end. A filter drum vertically fixedly disposed in the liquid container serves as a filter unit that is inserted in a standing or pending manner from above in the main part of the liquid container and fixed so as to be non-rotating. A wedge wire screen is disposed as a filter means on the outer circumference of the vertically aligned filter drum and a plurality of purifying elements positioned in an angularly offset manner are provided for the purification of the wedge wire screen. Each purifying element consists of a scraper and a brush strip abutting the circumference of the filter drum when the purification device is rotated by a drive. This known treatment device is technically complex and requires considerable space.

U.S. Pat. No. 4,751,006 discloses a unit for treating and cooling a cooling lubricant which has been heated during the operation of the machine tool. The tool comprises a scraper conveyor having transversely aligned scraper strips for conveying off the chips in a storage compartment for the liquid contaminated by solids or chips. In the upper part of the storage compartment, a filter unit is provided that contains a continually driven traveling screen and a non-intermittent paper band filter resting on the same. The paper band of the filter is drawn off a roll, runs through the filtering station on the traveling screen and is rolled on a second roll together with the deposited solids.

Furthermore, European patent EP-B-1,474,268, for example, discloses a device for separating chips and cooling lubricant liquid from the material-removing machining of workpieces which has a storage container for the mixture of cooling lubricant liquid and chips and an endless conveyor disposed in the container. The endless conveyor is in the form of a scraper conveyor that runs over several deflection pulleys in the storage container and conveys the collected solids (chips) to an upper ejector via an oblique discharge portion. In the transition between the horizontal and the oblique portions of the scraper conveyor, a horizontally aligned filter drum is rotatably supported that is driven by the circulating scraper conveyor. A negative pressure is maintained in the filter drum so that the liquid is sucked inside the drum through the filter. The supportive assembly of the filter drum consists of a respective frontal internal and external supporting ring and axis-parallel spring elements and sealing means. The drum is provided with filter clothing on the outer circumference thereof. In this known device, the efforts required for effectively purifying the filter drum and its ancillary units in particular are a disadvantage. Furthermore, special measures are required for adapting the device to different or changing operating parameters of the respectively associated machine tool.

SUMMARY OF EMBODIMENTS OF THE INVENTION

It is a purpose of the invention to provide a device for treating or purifying cooling lubricants (KSS) which enables an effective conveyance of the coarser dirt particles and chips as well as an effective purification of the lubricating liquid by separating very fine chips and dust particles, and the filter aggregate of which can be dismounted from the device and cleaned by simple measures.

In one embodiment of the invention, the device for treating cooling lubricants and chips or shavings of machine tools comprises a container for receiving the untreated mixture of cooling lubricant liquid and solids. An endless conveyor for carrying off the collected solids from the container is disposed in the container and suitably formed as a scraper conveyor. At least one filter unit, which is disposed in the container and in which a negative pressure is maintained, is used to separate the cooling lubricant from the solids contained therein. The filter unit is formed so as to be mobile or movable and can be positioned as an insertion in the container above the lower run of the endless conveyor.

The inventive development of the filtration unit as an independent assembly results in the advantage that the filtration unit can be taken out of the device, cleaned and subsequently be re-inserted to its original site in the device in a very simple manner. There is the suitable possibility to keep a plurality of similar or different filtration units in store and to insert a particularly suitable aggregate into the device depending on specific operating conditions. In addition, inspection and maintenance work on the filtration units is made simpler due to their being dismountable.

Advantageously, the filtration unit includes a flat sieve box in which there is a negative pressure and which has a planar wedge wire sieve between two lateral longitudinal beams and an endless filtering cloth moving in the longitudinal direction, the cooling lubricant liquid being sucked from below through the filtering cloth into the interior of the sieve box. The flat sieve box of the filtration unit enables its simple insertion between the lower run and the upper run of the endless conveyor and the arrangement of the longitudinally moved endless filtering cloth on the planar wedge wire screen results in the flexible filtering cloth being supported on a large area even in case considerable negative pressure is applied to the interior of the sieve box. Thus, it is also possible to use fine-pored or fine-meshed filtering cloths having an appropriately high purifying effect. A fine-meshed steel fabric has proven to be particularly durable and wear-resistant as a band filter. The band filters are guided over optionally driven deflection pulleys at the front and rear ends of the filter box, which deflection pulleys are supported in supports at the longitudinal beams.

A particularly practical advantage is offered by a further embodiment of the invention according to which an insertion mechanism is provided on the side of the sieve box. This insertion mechanism may have a pole-like pull and push bar comprising a handle and engaging with a longitudinal beam of the sieve box by means of which the sieve box may be laterally pulled out of the device for cleaning or pushed back into its operating position.

An additional sorting effect of the treatment device according to the invention may be achieved by the fact that a intermediate bottom provided with passages of suitable size is provided for collecting the coarser chips in the container above the sieve box. The intermediate bottom is disposed in the area of influence of the upper run of the endless conveyor. Coarse chips drop to the intermediate bottom and are transported by the tongue ends of the conveyor chain up until beyond the end of the filtration unit. Since the intermediate bottom has slit-shaped passages of respectively suitable opening width, the cooling lubricant and the fine chips may discharge through these openings into the lower area of the chip conveyor and be collected by the lower run thereof or sucked into the interior of the sieve box.

For the purpose of intensively purifying the filtering cloth and the other components, purifying nozzles may be installed in the sieve box, via which a fluid, for example, pressurized air or purified cooling lubricant, is sprayed on the filter fabric from inside.

Finally, a particularly simple handling of the filtration unit may be achieved by the fact that the filtration unit as a whole or including its functionally relevant components may be extended out of its operating position and inserted into the same.

BRIEF DESCRIPTION OF THE DRAWING

The invention is further described below by means of the subsequent detailed description of advantageous embodiments of the invention, reference being made to the accompanying drawing, wherein.

DETAILED DESCRIPTION OF EMBODIMENTS OF THE INVENTION

Figure 1:
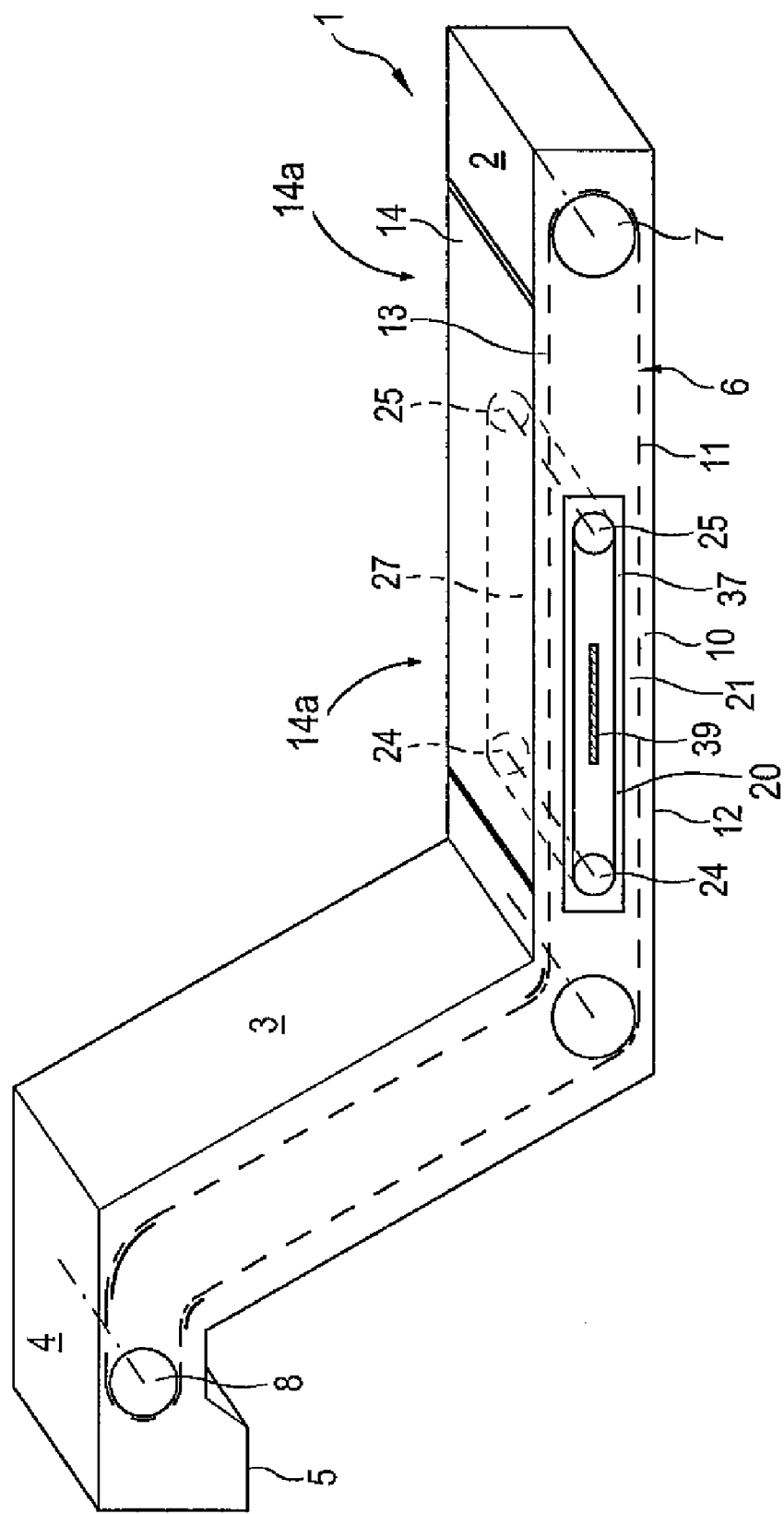
FIG. 1 shows an embodiment of the treatment device according to the invention in a roughly schematic perspective view.

The embodiment of the inventive treatment device as shown includes container 1 which may be a lower part of a larger storage container for the untreated mixture of KSS, chips, among others, coming out of the machine tool. Container 1 has upper inlet opening 14 through which the untreated mixture of cooling lubricant (KSS) and solids deposited therein, such as chips, dirt particles or the like, is introduced into the container as shown by the two curved arrows 14a. At the left end in FIG. 1, a portion 3 running upward in an oblique manner is attached to horizontal part 2 of the container. The upper end of oblique portion 3 turns into an ejection head 4 containing ejection opening 5 pointing downward. Preferably, the container is made of corrosion-resistant steel sheet. An endless conveyor 6 is disposed in container 1 which, in this case, is formed as a commonly known scraper conveyor and runs over driving and deflection pulleys 7, 8. This scraper conveyor has two endless chains running parallel to each other, of which only one endless chain 10 is shown. The two parallel chains are connected to each other by scraper strips 9 (FIG. 3) disposed at predetermined intervals. Lower run 11 of the scraper conveyor travels at a small vertical distance from bottom 12 of the container and upper run 13 of scraper conveyor 6 travels at a small distance below the upper edge of container part 2.

The treatment device as shown has filtration unit 20 which in the operating state as shown is placed as an insertion in the horizontal part 2 of container 1 in the space between lower run 10 and upper run 13 of the chain conveyor. This filtration unit may be pulled out of the shown position in the container in a simple manner and, after inspection or maintenance work has been performed on details of the filtration unit, for example, it may be re-inserted into the shown position in the container.

Figure 2:
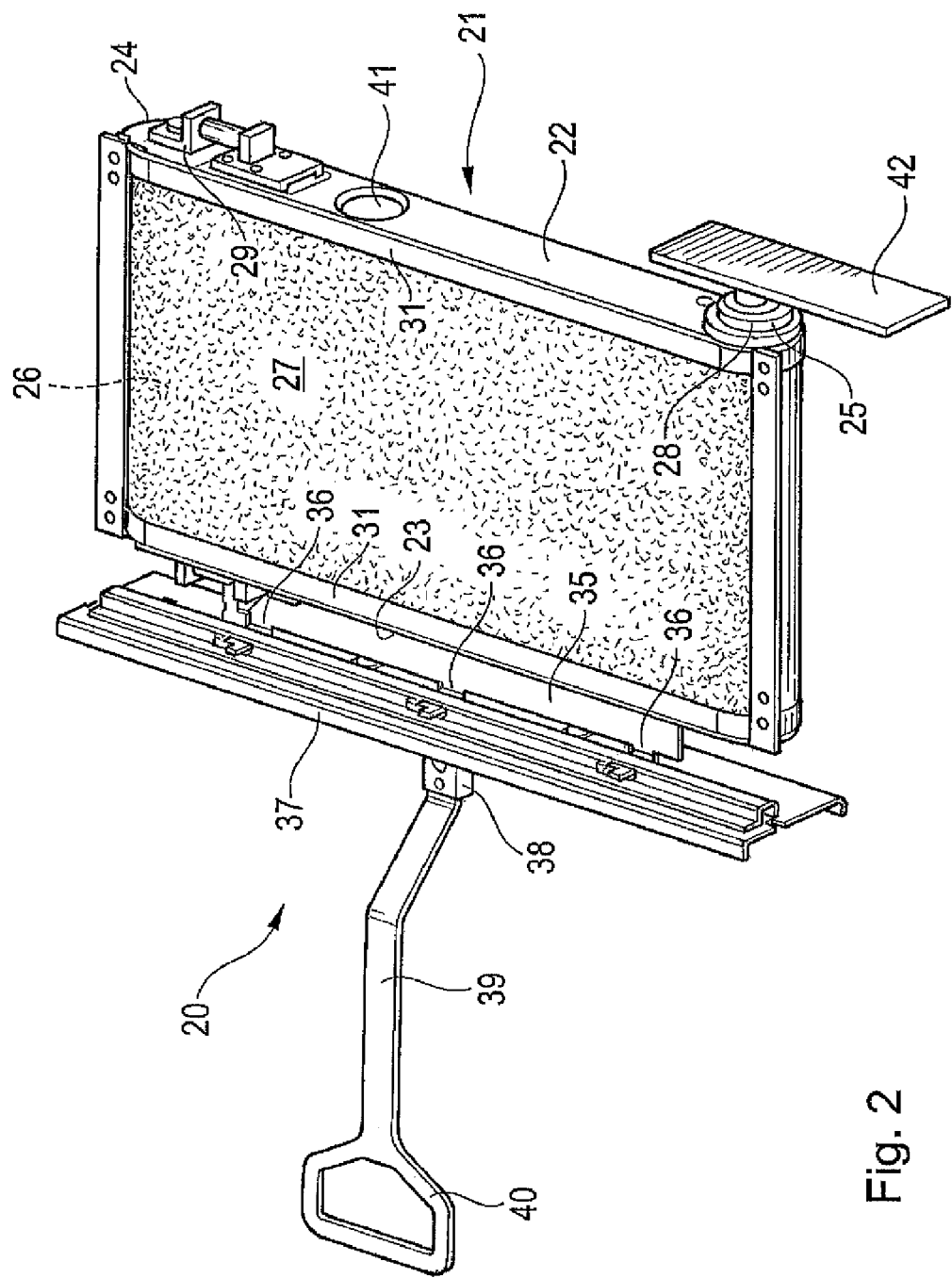
FIG. 2 shows a filter box used in a device according to FIG. 1 in a schematic perspective view.

FIG. 2 shows a preferred embodiment of filtration unit 20 in a perspective schematic view. The filtration unit contains a sieve or filter box 21 which is shown in the form of a filter cartridge box. This filter cartridge box contains two side walls 22, 23 of a profiled cross-section that are parallel to each other and have supports 24, 25 at their ends. In the clean space between side walls 22, 23, a rectangular closed container or storage box 26 is disposed. On the floor of box 26 is flat sieve 30 (FIG. 3) that may consist of a slit sheet or a plurality of parallel rods. An endless filtering cloth 27, that may consist of a high-tensile fleece or a fine-meshed flexible steel fabric and circulates about end-side driving and deflection pulleys 28, 29, travels on the outside of storage box 26. These pulleys 28, 29, are rotatably supported in supports 24, 25 of side walls 22, 23. Sealing rubber bands 31 are provided on both sides of endless filtering cloth 27 above side walls 22, 23. The sealing rubber bands circulate together with the endless filtering cloth 27 or may also be formed to be stationary. In order to maintain a predetermined longitudinal tension of endless filtering cloth 27, screw tensioners are mounted to the outer surfaces of the side walls by which the support 24, 25 can be adjusted in the longitudinal direction. The fine-meshed steel fabric of endless filtering cloth 27 should have a mesh size of from 30 to 150 μm, preferably from 50 to 80 μm.

An elongated flat intermediate support 35 is mounted on left side wall 23 of sieve box 21, as shown in FIG. 2. This intermediate support has three tongues 36 spaced apart from each other that pivotably engage with a sectional strip fixed to the rear side of elongated upright sheet section 37. This sheet section has a central bearing 38 on which a pole-like pull and push rod 39 is supported that ends in a handle 40. By means of pull and push rod 39, the shown wedge wire sieve box 21 may manually be moved transversely to the longitudinal direction thereof.

In at least one of side walls 22, 23, opening 41 is provided which is a liquid passage to the interior of sieve box 21. This opening provides communication with a lifting pump via suitable connecting means, such as hoses, plug-type connections, and the like (not shown).

Figure 3:
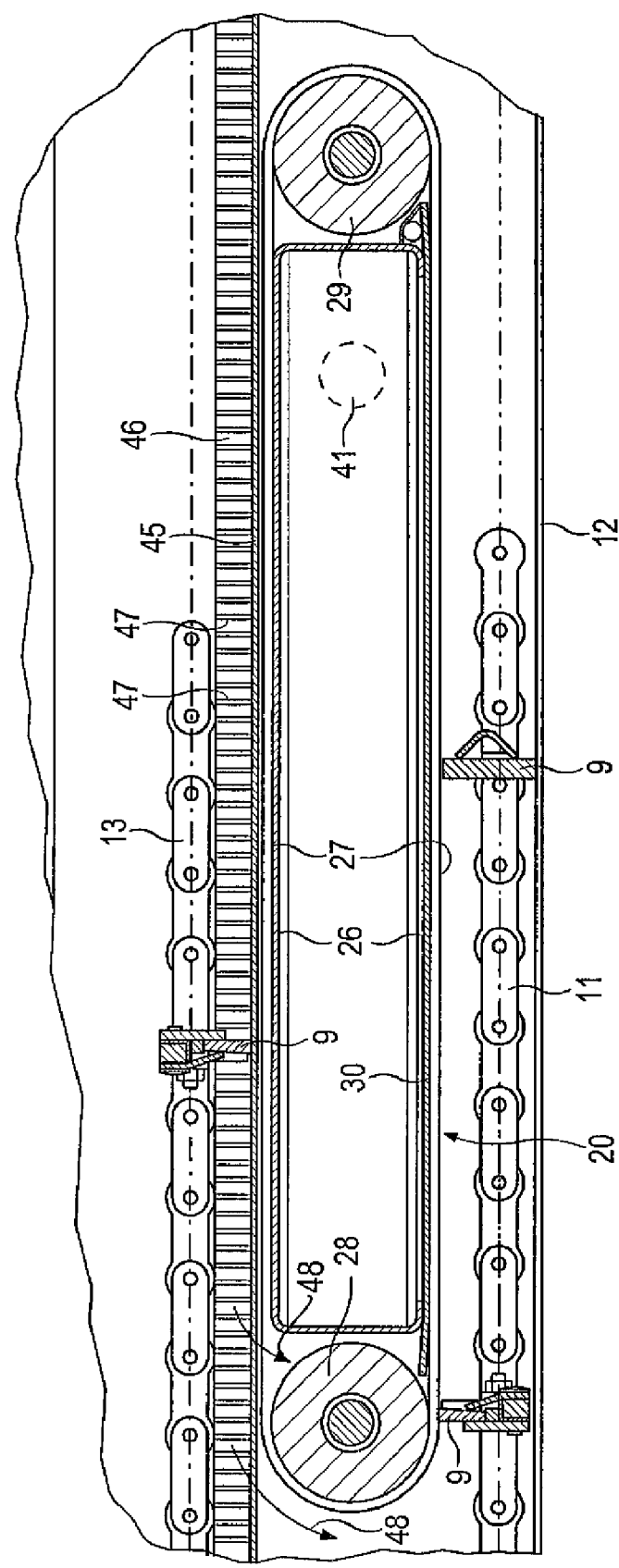
FIG. 3 is an enlarged schematic side section of the treatment device in the embodiment of FIG. 1 in the area of the filtration unit.

As can be taken from FIG. 3, a planar intermediate bottom 45 whose both longitudinal edges 46 are vertically bent upward is disposed in the embodiment as shown between upper run 13 of scraper conveyor 6 and the top surface of filtration unit 20. In each of longitudinal edges 46, a plurality of equally spaced apart lateral slit openings 47 is formed. Coarser chips drop to intermediate bottom 45 and are removed by transverse strips 9 of scraper conveyor 6. The cooling lubricant and the fine chips flow through the lateral slit openings in edges 46 of intermediate bottom 45 into the lower portion of scraper conveyor 6, as indicated by curved arrows 48. For driving endless filtering cloth 27, a direct or indirect drive is used, which here is shown as a chain wheel drive, the chain wheel of which engages in the link chain in lower run 11 of the scraper conveyor. The shaft of the chain wheel is connected to the driving shaft for the endless filtering cloth 27 via a belt drive. Of course, other suitable drive arrangements may also be used for the direct or also indirect drive of filtering cloth 27. In the embodiment as shown, purifying nozzles are provided below the left bearing assembly in FIG. 3, which nozzles spray purified cooling lubricant from inside onto the filter fabric in order to remove dirt adhering to the filter fabric.

The method of function of the above described treatment device will now be described.

The mixture to be purified of cooling lubricant liquid, chips, and possibly other solid particles flows through upper inlet opening 14 into horizontal part 2 of container 1. The coarser chips are deposited on intermediate bottom 45 and are carried off by scraper strips 9 of upper run 13 of the scraper conveyor. The cooling lubricant together with the fine-grained solid particles flows through lateral slit openings 47 in longitudinal edges 46 of intermediate bottom 45. As there is a negative pressure in the interior of container box 26 due to the influence of the lifting pump, connected through opening 41, the cooling lubricant and the fine-grained solids are sucked through the lower run of circulating endless filtering cloth 27 and through flat sieve 30 into the interior of container box 26 and are discharged via opening 41 and the pump, or are returned to the processing machine. When particular materials are machined, large portions or amounts of fine-grained chips are often produced, by which the conventional connected treatment or purifying devices are correspondingly highly strained. In these cases, the used sieves or screens and filter elements in particular have to be purified or exchanged relatively often, which means an interruption of the purifying operation. Due to the mobile filtration unit as a mounted assembly, as disclosed herein the check and maintenance work is considerably facilitated because all relevant processes can be performed outside of the purifying or treatment device when the filtration unit is pulled out.

The invention is not limited to the embodiment as shown. In order to enhance the mobility and movability of filtration unit 20, rollers or sliding means may be provided on a lower support construction so that only a small force has to be exerted for pushing in and pulling out the filtration unit with sieve box 21. Other variants are also possible, for example, the use of other types of sieves instead of wedge wire screen shown. It is also possible to use other known filter materials instead of the fine-meshed steel wire fabric for the continually circulating filtering cloth 27.

What is claimed is:

1. A device for treating cooling lubricants and chips of machine tools, the device comprising:
    a container for receiving an untreated mixture of cooling lubricant liquid and solids;
    an endless conveyor installed in said container for carrying off collected solids from said container; and
    at least one filtration unit disposed in said container for separating the cooling lubricant liquid from the solids, the filtration unit formed so as to be mobile and can be positioned as an insertion in the container above the lower run of the endless conveyor, roller or sliding means provided on a lower support structure for pushing in and pulling out said filtration unit through an opening in a sidewall of said container, wherein said filtration device includes a flat sieve box in which there is a negative pressure and which has a planar sieve between two side walls and an endless filtering cloth moving in the longitudinal direction, the cooling lubricant liquid being sucked from below through the endless filtering cloth into the interior of the sieve box.

2. The device according to claim 1, and further comprising sealing bands disposed above said side walls of said sieve box.

3. The device according to claim 2, and further comprising supports on the side walls for deflection pulleys of the endless filtering cloth.

4. The device according to claim 2, wherein the endless filtering cloth consists of a finely-meshed steel fabric having a mesh size of from 30 to 150 µm.

5. The device according to claim 4, wherein the endless filtering cloth consists of a finely-meshed steel fabric having a mesh size from 50 to 80 µm.

6. The device according to claim 2, and further comprising an insertion mechanism on the side of the sieve box for selectively inserting the sieve box into an operating position thereof in the device and pulling the same out of the operating position.

7. The device according to claim 6, wherein said insertion mechanism has a pull and push rod comprising a handle and engaging in one of the side walls of the sieve box.

8. The device according to claim 1, and further comprising supports on the side walls for deflection pulleys of the endless filtering cloth.

9. The device according to claim 8, wherein the endless filtering cloth consists of a finely-meshed steel fabric having a mesh size of from 30 to 150 µm.

10. The device according to claim 9, wherein the endless filtering cloth consists of a finely-meshed steel fabric having a mesh size from 50 to 80 µm.

11. The device according to claim 8, and further comprising tensioning means on the sieve box for maintaining a continuous axial tension of the endless filtering cloth.

12. The device according to claim 1, wherein the endless filtering cloth consists of a finely-meshed steel fabric having a mesh size of from 30 to 150 µm.

13. The device according to claim 12, wherein the endless filtering cloth consists of a finely-meshed steel fabric having a mesh size from 50 to 80 µm.

14. The device according to claim 1, wherein the endless filtering cloth consists of a finely-meshed steel fabric having a mesh size from 50 to 80 µm.

15. The device according to claim 1, and further comprising an insertion mechanism on the side of the sieve box for selectively inserting the sieve box into an operating position thereof in the device and pulling the same out of the operating position.

16. The device according to claim 15, wherein said insertion mechanism has a pull and push rod comprising a handle and engaging in one of the side walls of the sieve box.

17. The device according to claim 15, and further comprising an intermediate bottom provided with lateral passage openings in the container above the sieve box, on which intermediate bottom the coarser chips are deposited until they are carried off by the conveyor.

18. The device according to claim 15, and further comprising a direct or indirect drive for the circulating the movement of the endless filtering cloth.

19. The device according to claim 15, and further comprising tensioning means on the sieve box for maintaining a continuous axial tension of the endless filtering cloth.

20. The device according to claim 1, and further comprising an intermediate bottom provided with lateral passage openings in the container above the sieve box, on which intermediate bottom the coarser chips are deposited until they are carried off by the conveyor.

21. The device according to claim 1, and further comprising a direct or indirect drive for the circulating the movement of the endless filtering cloth.

22. The device according to claim 21, and further comprising tensioning means on the sieve box for maintaining a continuous axial tension of the endless filtering cloth.

23. The device according to claim 1, and further comprising tensioning means on the sieve box for maintaining a continuous axial tension of the endless filtering cloth.

* * * * *